United States Patent
Wasiq et al.

(10) Patent No.: US 10,248,532 B1
(45) Date of Patent: Apr. 2, 2019

(54) SENSITIVE DATA USAGE DETECTION USING STATIC ANALYSIS

(71) Applicant: Amazon Technologies, Inc., Seattle, WA (US)

(72) Inventors: Muhammad Wasiq, Vancouver (CA); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 619 days.

(21) Appl. No.: 14/855,139

(22) Filed: Sep. 15, 2015

(51) Int. Cl.
*G06F 17/30* (2006.01)
*G06F 11/34* (2006.01)
*G06N 5/02* (2006.01)
*G06F 17/27* (2006.01)

(52) U.S. Cl.
CPC ...... *G06F 11/3452* (2013.01); *G06F 17/2725* (2013.01); *G06F 17/2735* (2013.01); *G06F 17/30604* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 7,941,859 B2 | 5/2011 | Camenisch et al. | |
| 8,024,397 B1* | 9/2011 | Erickson | G06F 9/5055 707/602 |
| 8,346,929 B1* | 1/2013 | Lai | G06Q 10/10 709/226 |
| 8,539,593 B2 | 9/2013 | Tan et al. | |
| 8,726,392 B1 | 5/2014 | McCorkendale et al. | |
| 8,856,869 B1 | 10/2014 | Brinskelle | |
| 8,869,286 B1 | 10/2014 | Liu | |
| 8,949,994 B2 | 2/2015 | Amit et al. | |
| 8,984,642 B2 | 3/2015 | Pistoia et al. | |
| 9,009,305 B1 | 4/2015 | Callau | |
| 9,075,997 B2 | 7/2015 | Artzi et al. | |
| 9,818,145 B1* | 11/2017 | Finkelstein | G06Q 30/0631 |
| 2005/0120029 A1* | 6/2005 | Tomic | G06F 17/30917 |
| 2010/0199169 A1* | 8/2010 | Gnech | G06F 17/30893 715/234 |

(Continued)

OTHER PUBLICATIONS

U.S. Appl. No. 15/279,345, filed Sep. 28, 2016, Kenneth Grey Richards et al.

(Continued)

*Primary Examiner* — Bai D Vu
(74) *Attorney, Agent, or Firm* — Robert C. Kowert; Meyertons, Hood, Kivlin, Kowert & Goetzel, P.C.

(57) ABSTRACT

Methods, systems, and computer-readable media for implementing sensitive data usage detection using static analysis are disclosed. A specification of one or more operations exposed by a service in a service-oriented system is obtained from a repository. The names of the one or more operations are determined in the specification. The names of one or more parameters of the one or more operations are determined in the specification. The names of the one or more operations and the names of the one or more parameters are checked against a dictionary of sensitive terms. One or more sensitive operations are determined among the one or more operations. One or more consumers of the one or more sensitive operations are determined.

20 Claims, 7 Drawing Sheets

(56) References Cited

U.S. PATENT DOCUMENTS

2017/0134479 A1* 5/2017 Kalgi .................. H04L 67/10
2017/0293887 A1* 10/2017 Rathbun ............... G06Q 10/10

OTHER PUBLICATIONS

U.S. Appl. No. 15/279,346, filed Sep. 28, 2016, Kenneth Grey Richards et al.
U.S. Appl. No. 15/279,347, filed Sep. 28, 2016, Kenneth Grey Richards et al.
U.S. Appl. No. 15/279,351, filed Sep. 28, 2019, Kenneth Grey Richards et al.
Srikanth Kandula, et al., "The Nature of Datacenter Traffic: Measurements & Analysis", IMC'09, ACM, Nov. 4-6, 2009, pp. 202-208.
Albert Greenberg, et al., "VL2: A Scalable and Flexible Data Center Network", SIGCOMM'09, ACM, Aug. 17-21, 2009, pp. 1-12.
U.S. Appl. No. 14/133,545, filed Dec. 18, 2013, Jon Arran McClintock et al.
Chard Ryan et al, "Network Health and e-Science in Commercial Clouds", Future Generations Computer Systems, Elsevier Science Publishers, Amsterdam, NL, vol. 56, Jun. 23, 2015, pp. 595-604.
Amazon Web Services, "Best Practices for Deploying Amazon WorkSpaces—Network Access, Directory Services, and Security", Jul. 1, 2016, Retrieved from URL: https://d1awsstatic.com/whitepapers/workspaces/Best_Practices_for_Deploying_Amazon_WorkSpaces.pdf, 45 pages.

* cited by examiner

SENSITIVE DATA USAGE DETECTION USING STATIC ANALYSIS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for providing sensitive data usage detection using static analysis are described. As described herein, static analysis of source code and metadata for services in a service-oriented system may identify operations and their consumers that potentially handle sensitive data or other particular types of data. A source code repository may store source code for services and specifications of operations exposed by services, and a metadata repository may store metadata indicating service dependencies and relationships. The service model for a particular service may be retrieved from the source code repository, and the operations exposed by the service and their input and output parameters may be extracted from the service model. The relationship of the service model to the particular service may be validated by matching the operation names in the service model against the operation names in the source code for the service (as retrieved from the source code repository). The names of the operations and names of the parameters may be checked against a dictionary of sensitive terms, and sensitive operations may be identified based on any suitable matches. Consumers of the particular service may be identified based on their dependency on client-side packages of the particular service (as specified in the metadata repository), and sensitive operations called by the consumers may be identified using source code for the consumers (as retrieved from the source code repository). Using this information identifying sensitive operations and their consumers, the flow of sensitive data may be mapped, and/or measures may be taken to secure sensitive data in the service-oriented system.

Figure 1:
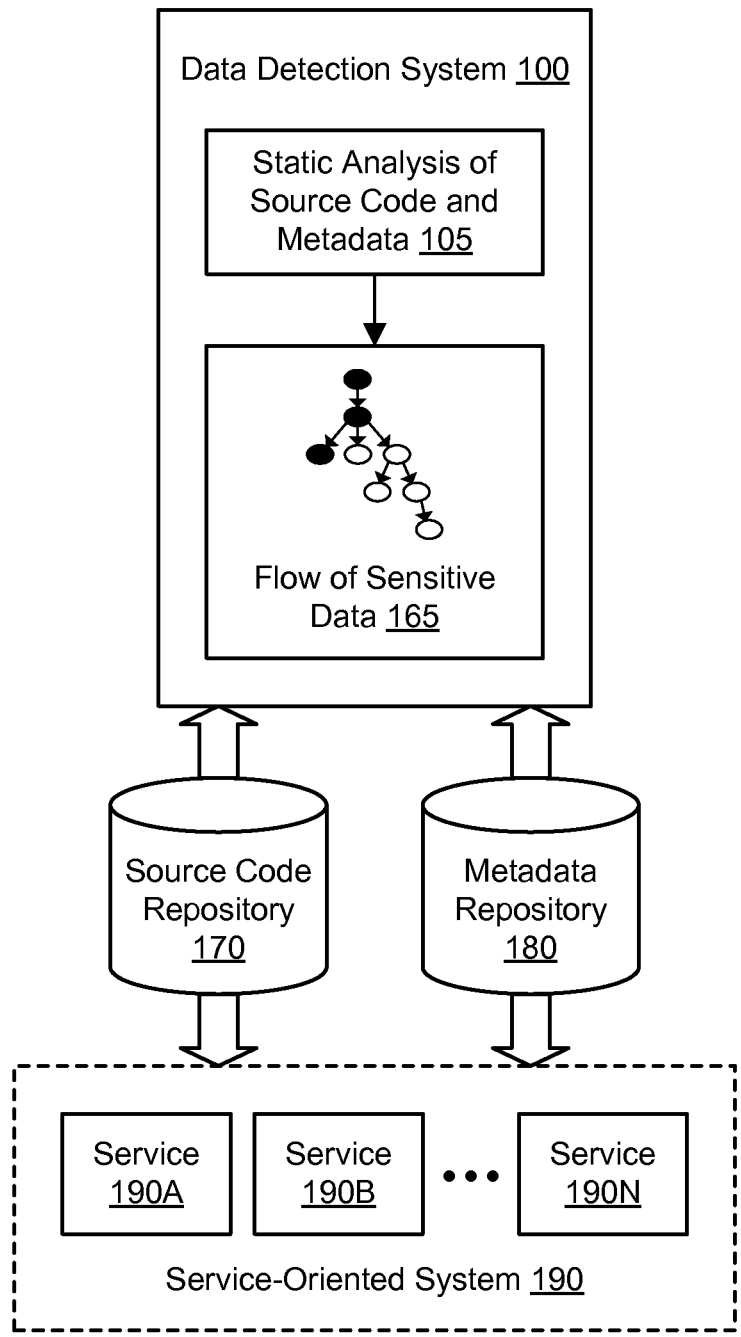
FIG. 1 illustrates an example system environment for sensitive data usage detection using static analysis, according to some embodiments.

FIG. 1 illustrates an example system environment for sensitive data usage detection using static analysis, according to some embodiments. A data detection system 100 may include a plurality of components for detecting usage of sensitive data (or other appropriate types of data) in services based (at least in part) on static analysis. In one embodiment, the data detection system 100 may include a functionality 105 for static analysis of source code and metadata associated with one or more services. A source code repository 170 may store source code for a plurality of services in a service-oriented system 190, such as services 190A and 190B through 190N. The source code repository 170 may also store service models for the services 190A-190N; the service models may specify the names of operations exposed by the services as well as the names of parameters (if any) for the operations. In one embodiment, the source code in the source code repository 170 may be organized by application package. A metadata repository 180 may store metadata for a plurality of services in the service-oriented system 190, such as services 190A and 190B through 190N. The service-related metadata in the metadata repository 180 may include, for example, package metadata that specifies the relationships (such as dependencies) between application packages. The source code repository 170 and metadata repository 180 may represent centralized components that are accessible to multiple developers of services in the service-oriented system 190. The source code repository 170 and metadata repository 180 may be implemented using any suitable storage technologies and may be coupled to the data detection system 100 through any suitable interconnects and/or networks. The source code repository 170 and metadata repository 180 may be implemented using the same storage and computational resources or different storage and computational resources.

Using the techniques described herein for static analysis of source code and/or service metadata, the data detection system 100 may identify services that process or handle particular types of data. In one embodiment, the particular types of data may include "sensitive" data, i.e., data whose security is deemed important. Types of sensitive data may include, for example, financial data or payment data (e.g., credit card numbers, gift card identifiers, etc.), personal identification data (e.g., Social Security numbers), e-mail address data, physical address data, etc. In one embodiment, the data detection system 100 may identify services that process data that is not expected to be seen at those services. In one embodiment, the data detection system 100 may identify services that process data that should be encrypted but that is processed in an insufficiently secure (e.g., plain-text) format by services. In one embodiment, the data detection system 100 may identify services that process types of data that the services should not be authorized to handle. In this manner, the data detection system 100 may be used to identify potential security breaches in a distributed, service-oriented system. It is contemplated that the techniques described herein may be used to identify services in a distributed, service-oriented system that process substantially any particular type of data.

Based on results generated by the static analysis functionality 105, the data detection system may determine a flow 165 of sensitive data among a set of services. The flow may be indicated using any suitable reports and/or visualizations. For example, the data detection system 100 may generate a map of service interactions in which the flow of sensitive data is emphasized using suitable visual indicators, such as different colors, weights, or textual labels for nodes and/or edges in a directed graph representing services and interactions (e.g., a call graph).

The service-oriented system 190 may be implemented according to a service-oriented architecture (SOA). A service-oriented architecture may include multiple services configured to communicate with each other (e.g., through message passing) to carry out various tasks. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration. A service may include one or more components that may also participate in the service-oriented architecture, e.g., by passing messages to other services or to other components within the same service. The service-oriented system 190 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). As shown in FIG. 1, the service-oriented system 190 may include a plurality of services such as services 190A and 190B through 190N. Although three services 190A, 190B, and 190N are shown for purposes of illustration and example, it is contemplated that any suitable number and configuration of services may be used with the service-oriented system 190.

In general, services may be configured to perform any of a variety of business processes. The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 7:
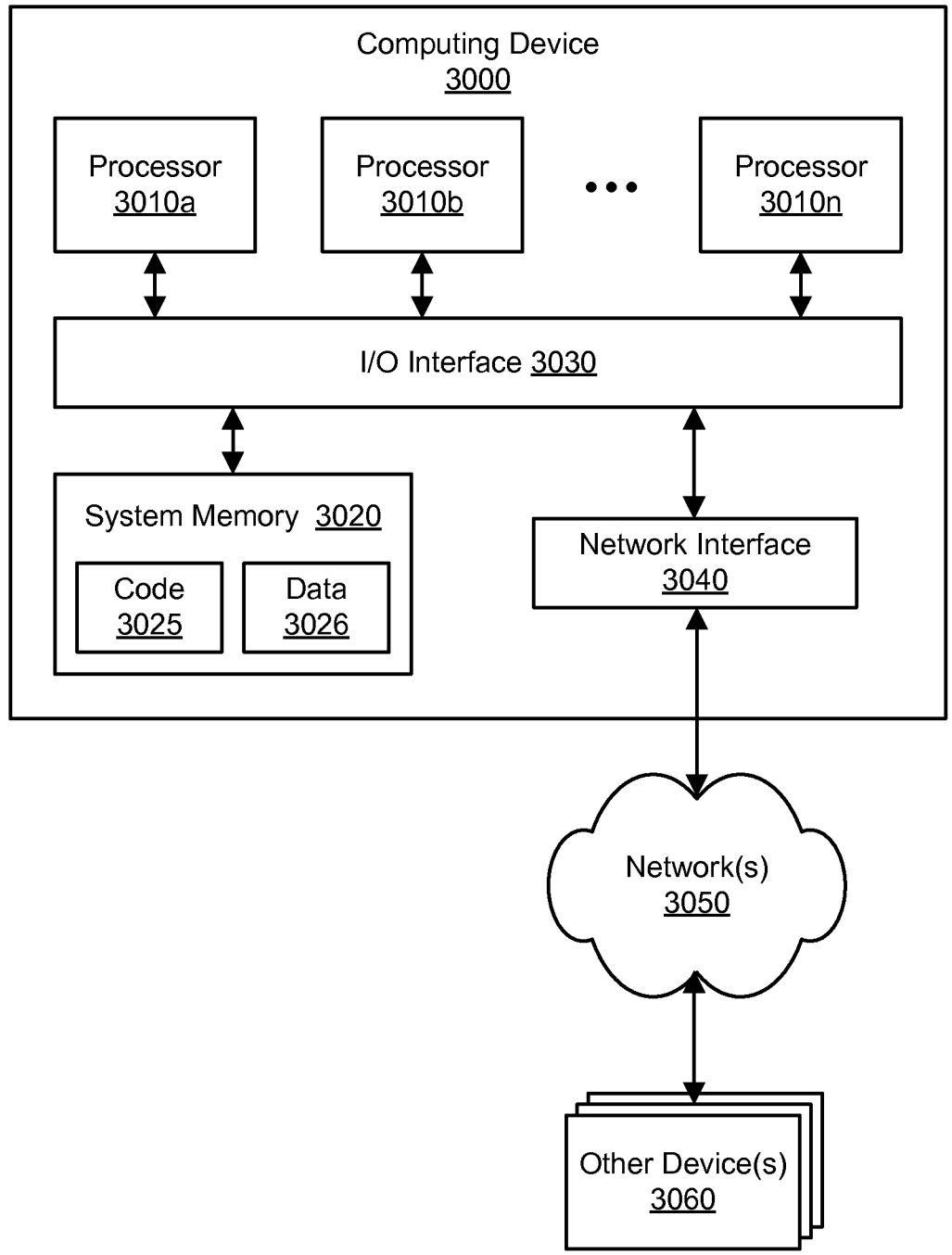
FIG. 7 illustrates an example of a computing device that may be used in some embodiments.

The data detection system 100 may be implemented using one or more computing devices, any of which may be implemented by the example computing device 3000 illustrated in FIG. 7. In various embodiments, portions of the functionality of the data detection system 100 may be provided by the same computing device or by any suitable number of different computing devices. If any of the components of the data detection system 100 are implemented using different computing devices, then the components and their respective computing devices may be communicatively coupled, e.g., via a network. Each of the illustrated components may represent any combination of software and hardware usable to perform their respective functions. It is contemplated that the data detection system 100 may include additional components not shown, fewer components than shown, or different combinations, configurations, or quantities of the components shown.

Figure 2:
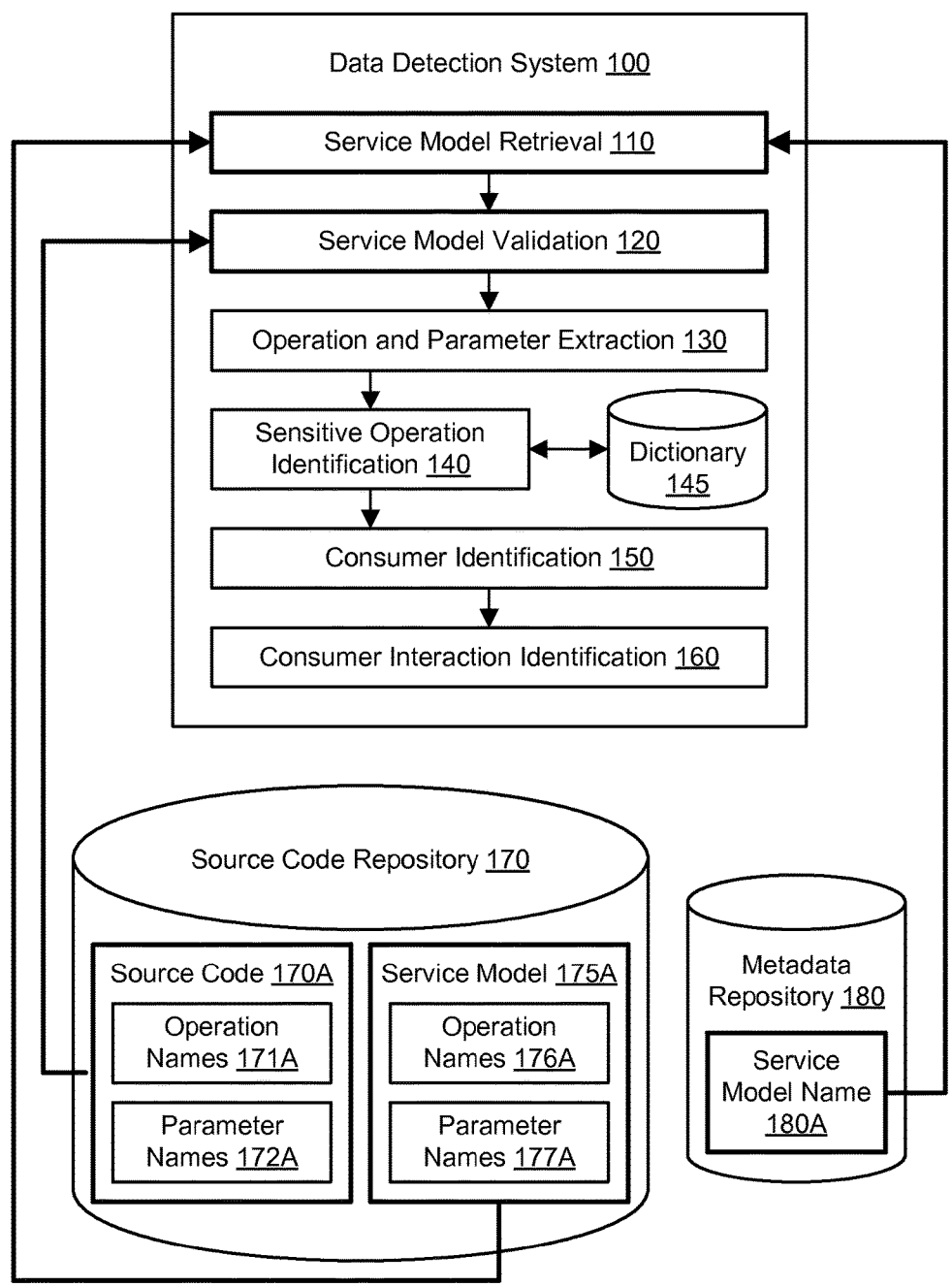
FIG. 2 illustrates further aspects of the example system environment for sensitive data usage detection using static analysis, including service model retrieval and validation, according to some embodiments.

FIG. 2 illustrates further aspects of the example system environment for sensitive data usage detection using static analysis, including service model retrieval and validation, according to some embodiments. The data detection system 100 may include a plurality of components for detecting usage of sensitive data (or other appropriate types of data) in services based (at least in part) on static analysis. In one embodiment, the data detection system 100 may include a service model retrieval functionality 110, a service model validation functionality 120, an operation name and parameter name extraction functionality 130, a sensitive operation identification functionality 140, a consumer identification functionality 150, and a consumer interaction identification functionality 160. In one embodiment, aspects of the functionality 105 for static analysis of source code and metadata associated with one or more services may be implemented by the service model retrieval functionality 110, the service model validation functionality 120, the operation name and parameter name extraction functionality 130, the sensitive operation identification functionality 140, the consumer identification functionality 150, and/or the consumer interaction identification functionality 160. The operation name and parameter name extraction functionality 130 and the sensitive operation identification functionality 140 are discussed in greater detail below with reference to FIG. 3. The consumer identification functionality 150 and the consumer interaction identification functionality 160 are discussed in greater detail below with reference to FIG. 4.

Turning back to FIG. 2, the source code repository 170 may store a service model 175A for a particular service (such as service 190A). The service model 175A may comprise a specification for one or more operations exposed by the service 190A, including the names 176A of one or more operations exposed by the service. The service model 175A may also comprise a specification for one or more parameters of the one or more operations, including the names 177A of one or more input parameters and/or one or more output parameters. The operations may represent various tasks that the service 190A is configured to perform when deployed in the service-oriented system 190, e.g., upon receiving appropriate service requests from other services.

The service model 175A may be expressed in a structured format such as XML (eXtensible Markup Language). An example of a service model for a service named "CustomerAddressService" is as follows:

<definition>
  <service name="CustomerAddressService">
    <operation target="GetAddress"/>
    <operation target="GetName"/>
  </service>
  <operation name="GetAddress">
    <input target="GetAddressInput"/>
    <output target="GetAddressOutput"/>
  </operation>
  <operation name="GetName">
    <input target="GetNameInput"/>
    <output target="GetNameOutput"/>
  </operation>
  . . . .
</definition>

Using the service model retrieval functionality 110, the data detection system 100 may retrieve the service model 175A for the service 190A, e.g., from the source code repository 170. The service model 175A may be obtained from the source code repository 170 based (at least in part) on the name of the service 190A. In one embodiment, the name of the service model may be guessed by applying one or more rules or heuristics to the name of the service 190A to generate a service model name. For example, the name of the service model 175A may contain the name of the service 190A, and the name of the service model 175A may be guessed by concatenating or otherwise combining the name of the service with one or more additional terms. As a further example, if the name of the service 190A is "CustomerAddressService," then the service model retrieval functionality 110 may attempt to retrieve a corresponding service model named "CustomerAddressServiceInterface." The service model 175A may be retrieved automatically and programmatically in response to a decision to detect the usage of sensitive data (if any) by the service 190A that is believed to correspond to the service model. In various embodiments, such a decision may be entered by a user of the data detection system 100 using appropriate user input or may be made automatically by the data detection system. In one embodiment, the metadata repository 180 may store information indicating the name 180A of the service model. The metadata repository 180 may be queried for the name 180A of the service model to validate the name before the service model 175A is retrieved (using the name) from the source code repository 170.

Using the service model validation functionality 120, the data detection system 100 may attempt to validate the relationship of the service model 175A to the service 190A. Validating the relationship may include determining further evidence that the service model 175A is indeed the model corresponding to the service 190A, thus confirming the "guess" that was made in retrieving the service model from the metadata repository 180. The relationship may be validated based (at least in part) on source code 170A for the service 190A. The source code 170A for the service 190A may be retrieved from a source code repository 170 that stores source code for a plurality of services in the service-oriented system 190. The source code 170A may be expressed in any suitable programming language or combination of languages, such as a high-level programming language. The source code 170A may include the names 171A of one or more operations exposed by the service. The source code 170A may also include the names 172A of one or more input parameters and/or one or more output parameters of the operations. The operation name(s) 176A in the service model 175A may represent application programming interfaces (APIs), and the operation name(s) 171A in the source code 170A may represent functions or methods. The relationship may be validated if the names 176A of the operation(s) in the service model 175A are found to match the names 171A of the operation(s) in the source code 170A for the service. The source code 170A for the service may be scanned to determine whether the operation name(s) match those of the service model 175A. In one embodiment, the names 172A of parameters of the operation(s) may also be checked against the corresponding names 177A in the service model 175A in validating the relationship. If the validation fails, then the data detection system 100 may again attempt to retrieve the correct service model for the service, potentially by soliciting user input from a developer of the service so that the name of the service model can be known definitively.

Figure 3:
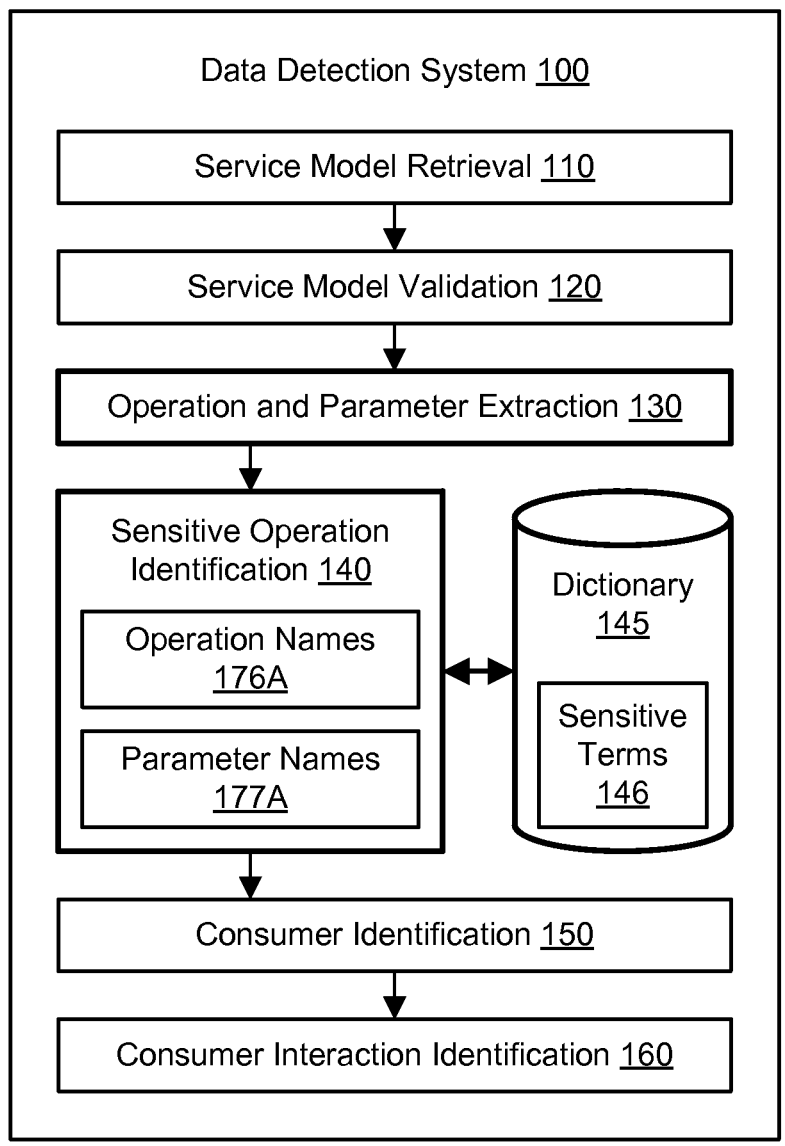
FIG. 3 illustrates further aspects of the example system environment for sensitive data usage detection using static analysis, including operation name and parameter name extraction and sensitive operation identification, according to some embodiments.

FIG. 3 illustrates further aspects of the example system environment for sensitive data usage detection using static analysis, including operation name and parameter name extraction and sensitive operation identification, according to some embodiments. Using the operation name and parameter name extraction functionality 130, the data detection system 100 may extract the names 176A of one or more operations from the service model 175A. Additionally, using the operation name and parameter name extraction functionality 130, the data detection system may extract the names 177A of one or more parameters of the one or more operations from the service model 175A. Not all operations may have corresponding parameters. The service model may be expressed in a structured format such as XML, and the operation names may be tagged or labeled appropriately. For example, an operation name for a service named "CustomerAddressService" may be expressed in the service model 175A as <operation name="GetAddress">. Similarly, the parameter names for a particular operation may be tagged or labeled appropriately in the service model 175A, such as <input target="GetAddressInput"/> and <output target="GetAddressOutput"/> within a block devoted to the GetAddress operation. Accordingly, the names of operations and the names of their parameters may be determined and extracted by scanning the service model 175A for appropriate tags or labels that indicate operations and their parameters.

Using the sensitive operation identification functionality 140, the data detection system 100 may identify one or more sensitive operations among the one or more operations exposed by the service. Sensitive operations may include operations that are likely to process or handle "sensitive" data types (e.g., data types whose security is deemed particularly important) or other data types of interest to the data detection system 100. To identify the sensitive operation(s), the names of the operations and the names of their parameters may be checked against a dictionary 145 of sensitive terms 146 to determine whether any of the operation names 176A and/or their parameter names 177A match any of the terms 146. For example, the dictionary 145 may include terms that relate to financial data of users (e.g., "credit card number," "debit card number," "bank routing number"), personal identification of users (e.g., "first name," "last name," "street"), and other terms that tend to indicate the sensitivity of data. Suitable heuristics may be applied to determine whether a particular operation is deemed sensitive. The heuristics may be based on the number of sensitive terms 146, if any, that are matched by the operation names 176A and/or parameter names 177A. For example, if an operation name and the corresponding parameter names match a predetermined number (e.g., two) of sensitive terms 146 from the dictionary 145, then the operation may be identified as a sensitive operation. If a parameter represents a complex data structure (e.g., a data structure with multiple data types and/or nested data), then the names of internal parameters of the complex data structure may be checked against the dictionary 145 of sensitive terms 146.

Figure 4:
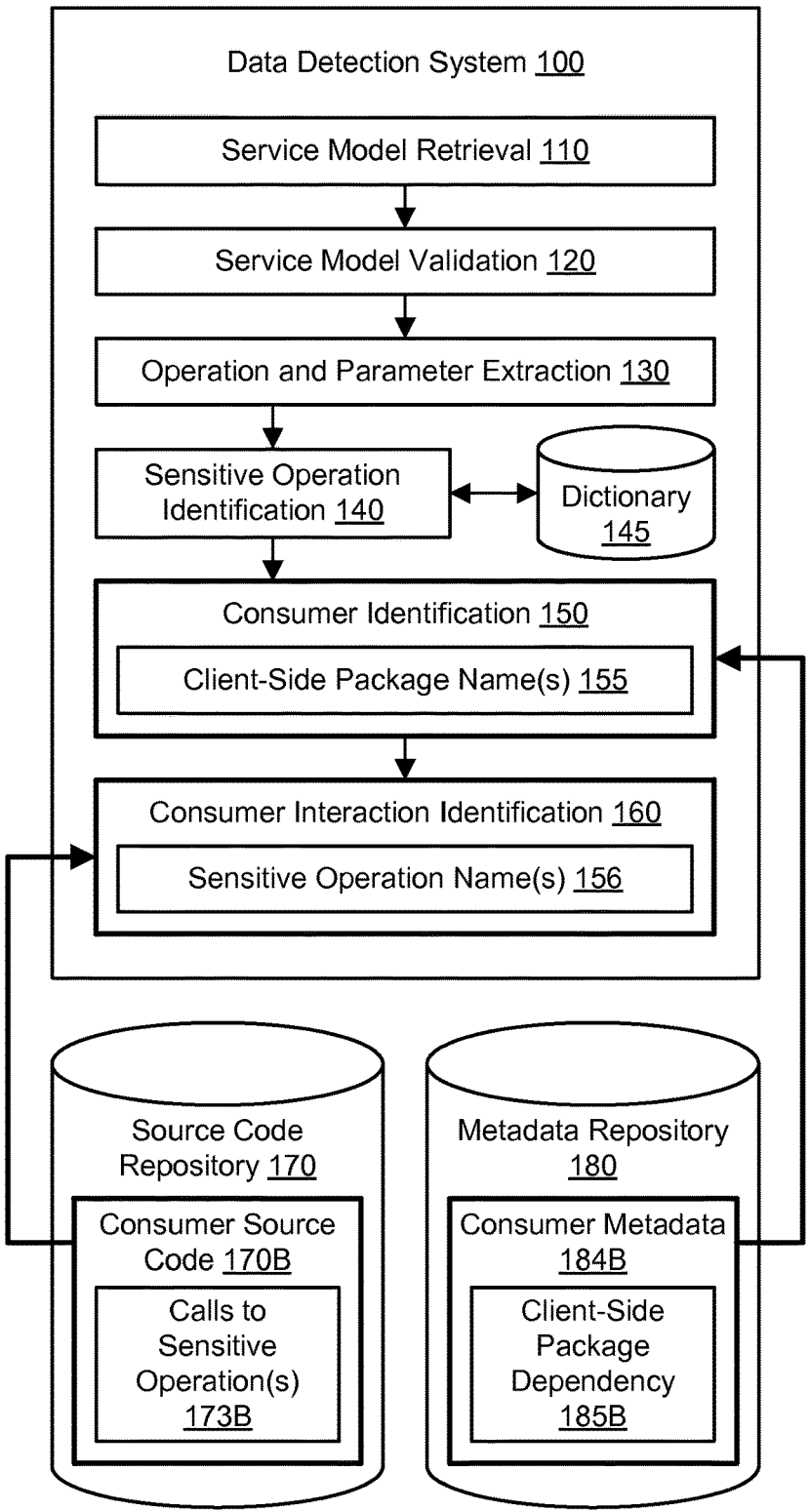
FIG. 4 illustrates further aspects of the example system environment for sensitive data usage detection using static analysis, including identification of consumers and their interactions with sensitive operations, according to some embodiments.

FIG. 4 illustrates further aspects of the example system environment for sensitive data usage detection using static analysis, including identification of consumers and their interactions with sensitive operations, according to some embodiments. Using the consumer identification functionality 150, the data detection system 100 may identify one or more consumers of the service 190A. The consumers may represent other services in the service-oriented system 190. In one embodiment, the consumer(s) may be identified using the metadata repository 180. The service 190A may be associated with one or more client-side packages that permit consumers to interact with the service. For example, the service 190A may have client-side packages such as a client configuration package and one or more client API packages. The client configuration package may define a configuration necessary to connect to the service 190A such as the service end point and TCP/IP port. The client API packages may provide language-specific application programming interfaces (APIs) to call the operations exposed by the service 190A. The names 155 of the client-side packages may be guessed using suitable rules or heuristics, e.g., based on the name of the service. For example, the names 155 of the client-side packages may include the name of the corresponding service, and the names 155 may be generated by adding one or more terms to the name of the service. The metadata repository 180 may be queried for the names 155 to validate whether client-side packages by such names exist. The metadata repository 180 may also store metadata that specifies a dependency of the identified consumers on the client-side package(s) of the service. For example, metadata 184B for a particular consumer may specify the client-side package(s) and thus indicate a dependency 185B of the particular consumer on the service. Using the consumer identification functionality 150, the metadata repository 180 may be queried for the names (or other identifiers) of application packages (including services in the service-oriented system 190) that have direct or indirect dependency on one or more of the client-side packages. The results of such a query may identify consumers of the service 190A.

As discussed above, the names 156 of one or more sensitive operations may be determined using the sensitive operation identification functionality 140. Using the consumer interaction identification functionality 160, the data detection system 100 may identify one or more of the sensitive operations called by the consumer(s) of the service 190A. In one embodiment, calls 173B to the sensitive operation(s) may be identified in source code 170B for the one or more consumers that were identified using the consumer identification functionality 150. The source code 170B for the consumer(s) may be obtained from the source code repository 170. The source code 170B may be scanned for the sensitive operation name(s) 156 to identify calls 173B to the sensitive operation(s). In one embodiment, the source code 170B may be scanned for the names of sensitive parameters (e.g., parameters whose names match terms 146 from the dictionary 145) to determine whether the consumer calls a sensitive operation in a manner that uses potentially sensitive data. If a parameter of a sensitive operation represents a complex data structure (e.g., a data structure with multiple data types and/or nested data), then the names of internal parameters of the complex data structure may be checked to determine whether the consumer calls the sensitive operation in a manner that uses potentially sensitive data. The calls 173B from the consumer(s) to the sensitive operation(s) of the service 190A may indicate a flow of sensitive data (or other data types of interest) in the service-oriented system 190.

Figure 5:
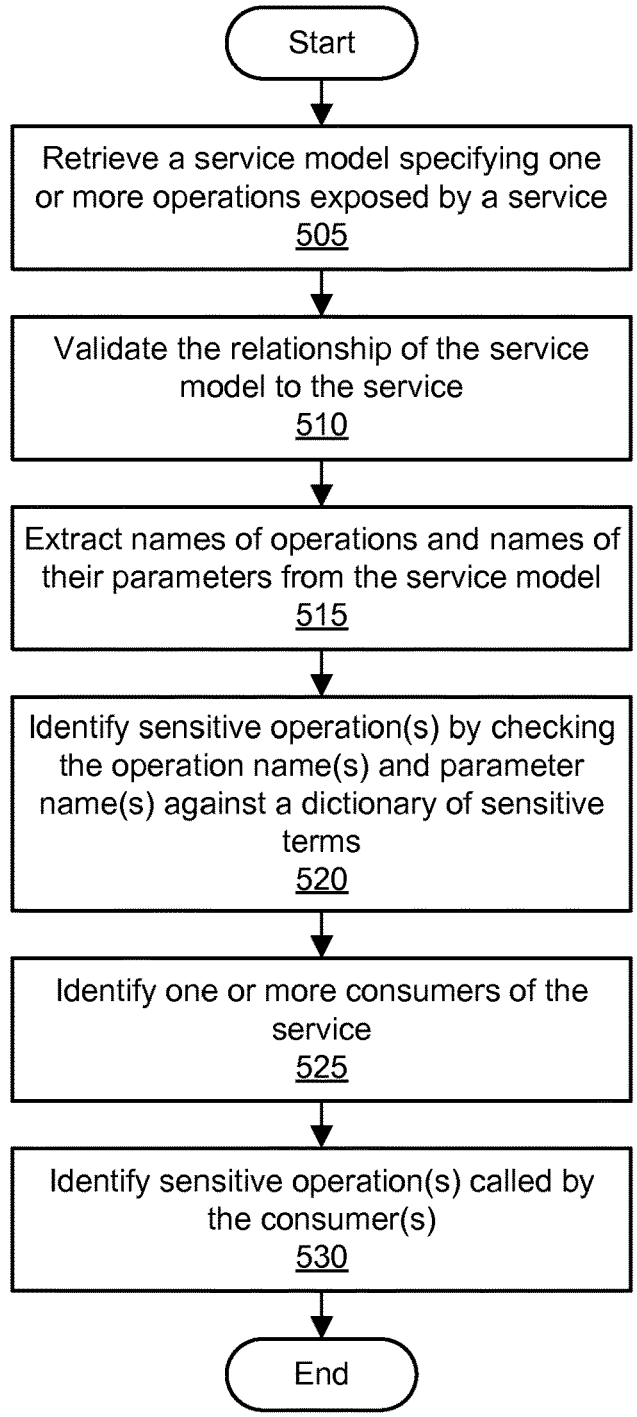
FIG. 5 is a flowchart illustrating a method for sensitive data usage detection using static analysis, according to some embodiments.

FIG. 5 is a flowchart illustrating a method for sensitive data usage detection using static analysis, according to some embodiments. As shown in 505, a service model for a service may be retrieved. The service model may comprise a specification for one or more operations exposed by the service, including the input parameters and/or output parameters for the operations. The operations may represent various tasks that the service is configured to perform when deployed in a service-oriented system, e.g., upon receiving appropriate service requests from other services. In one embodiment, the service model may be obtained from a source code repository, and the source code repository may store service models (and potentially other metadata) for a plurality of services in the service-oriented system. The service model may be obtained from the source code repository based (at least in part) on the name of the service. For example, the name of the service model may contain the name of the service, and the name of the service model may be guessed by concatenating or otherwise combining the name of the service with one or more additional terms. A metadata repository may store information indicating whether a service model using the guessed name exists. In one embodiment, the metadata repository may be queried for the name of the service model to validate the name before the service model is retrieved (using the name) from the source code repository.

As shown in 510, the relationship of the service model to the service may be validated. The relationship may be validated based (at least in part) on source code for the service. The source code for the service may be retrieved from the source code repository, and the source code repository may store source code for a plurality of services in the service-oriented system. The relationship may be validated if the names of the operation(s) in the service model are found to match the names of the operation(s) in the source code for the service. Accordingly, the source code for the service may be scanned to determine whether the operation name(s) match the service model. In one embodiment, the names of parameters of the operation(s) may also be checked in validating the relationship.

As shown in 515, the names of one or more operations may be extracted from the service model. Additionally, names of one or more parameters of the operation(s) may be extracted from the service model. The service model may be expressed in a structured format such as XML (eXtensible Markup Language), and the operation names may be tagged or labeled appropriately, such as <operation name="GetAddress">. Similarly, the parameter names for a particular operation may be tagged or labeled appropriately, such as <input target="GetAddressInput"/> and <output target="GetAddressOutput"/> within a block devoted to the GetAddress operation. Accordingly, the names of operations and the names of their parameters may be determined by scanning the service model for appropriate tags or labels that indicate operations and their parameters.

As shown in 520, one or more sensitive operations may be identified among the one or more operations exposed by the service. To identify the sensitive operation(s), the names of the operations and the names of their parameters may be checked against a dictionary of sensitive terms. For example, the dictionary may include terms that relate to financial data of users (e.g., "credit card number," "debit card number," "bank routing number"), personal identification of users (e.g., "first name," "last name," "street"), and other terms that tend to indicate the sensitivity of data. Suitable heuristics may be applied to determine whether a particular operation is deemed sensitive. For example, if an operation name and the related parameter names match a predetermined number (e.g., two) of sensitive terms from the dictionary, then the operation may be identified as a sensitive operation. If a parameter represents a complex data structure (e.g., a data structure with multiple data types and/or nested data), then the names of internal parameters of the complex data structure may be checked against the dictionary of sensitive terms.

As shown in 525, one or more consumers of the service may be identified. The consumers may represent other services in the service-oriented system. In one embodiment, the consumer(s) may be identified using a metadata repository. The service may be associated with one or more client-side packages that permit consumers to interact with the service. The metadata repository may store metadata that specifies a dependency of the identified consumers on the client-side package(s) of the service. For example, metadata for a particular consumer may specify the client-side package(s) and thus indicate a dependency of the particular consumer on the service.

As shown in 530, one or more of the sensitive operations called by the consumers of the service may be identified. In one embodiment, calls to the sensitive operation(s) may be identified in source code for the one or more consumers that were identified in the operation shown in 525. The source code for the consumer(s) may be obtained from the source code repository (e.g., the same repository that stores source code for the service that includes the sensitive operations). The calls from the consumer(s) to the sensitive operation(s) of the service may indicate a flow of sensitive data in the service-oriented system.

The operations shown in 505 to 530 may be performed again for other services, such as one or more consumers as identified in 525. Using this information, a map may be generated of service interactions in the service-oriented system, and service interactions associated with the one or more sensitive operations may be emphasized in the map. In one embodiment, one or more actions may be performed to secure or protect sensitive data used by the one or more sensitive operations. For example, a security review for the particular service may be prioritized based (at least in part) on the one or more sensitive operations. A security review may include any suitable manual review and/or programmatic review of the security of sensitive data handled by a service. In one embodiment, services with a greater number of consumers of sensitive data may be given a higher priority for review than services with a lower number of consumers of sensitive data. As another example, the source code of the service may be modified to ensure greater security of sensitive data. Similarly, the service may be migrated to a more secure deployment environment to ensure greater security of sensitive data.

In one embodiment, the metadata repository 180 may store deployment metadata that is used by the data detection system 100. The deployment metadata may indicate where and/or how one or more services are deployed, e.g., in particular deployment environments having particular configurations and attributes. The metadata repository 180 may be queried for deployment metadata for a particular service to determine which other services are deployed with the particular service. The metadata repository 180 may then be queried for use of client-side packages for the particular service by the other services, and calls by the other services to sensitive operations may be identified. In one embodiment, the deployment metadata may also indicate that a particular consumer of a service is not actually deployed and thus that the particular consumer does not receive sensitive data from the service. In this manner, the deployment metadata may be used to reinforce the static analysis based on package metadata.

Pattern-Based Data Detection Using Data Injection

In various embodiments, the techniques discussed above for sensitive data usage detection using static analysis may be used in combination with techniques for data detection using injection of data values and pattern-based detection of the injected values. For example, the pattern-based detection may be used to verify the findings of the data detection system 100 (e.g., to verify the services that include sensitive operations and/or the flow of sensitive data 165 among services) by executing the services on injected data values (e.g., for sensitive data). As another example, the data detection system 100 may find one or more services that handle sensitive data but that are not integrated into a tracing system that monitors run-time service interactions; the owners of such services may be asked to integrate the services into the tracing system.

Figure 6:
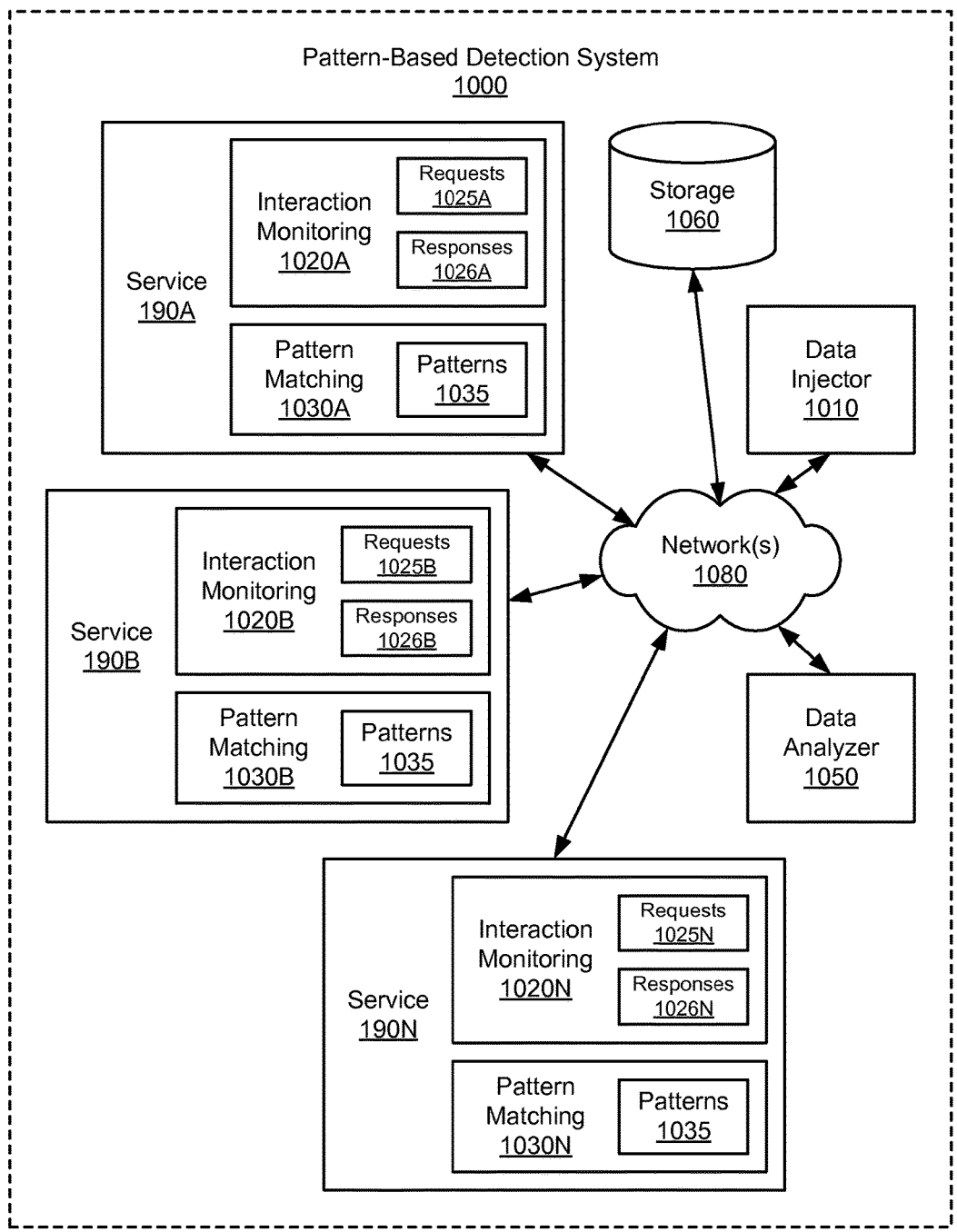
FIG. 6 illustrates an example system environment for pattern-based detection using data injection, according to some embodiments.

FIG. 6 illustrates an example system environment for pattern-based detection using data injection, according to some embodiments. The example system environment 1000 may include various components such as a data injector 1010, a data analyzer 1050, storage resources 1060, and a plurality of services 190A-190N in the service-oriented system 190. The various components of the pattern-based detection system may be coupled via one or more networks(s) 1080. The data injector 1010 may define specific data values and provide the specific data values to components of the service-oriented system 190 in various ways. As will be described in greater detail below, the use of the specific data values may then be detected using service instrumentation. The data injector 1010 and data analyzer 1050 may be implemented using one or more computing devices, any of which may be implemented by the example computing device 3000 illustrated in FIG. 7. The storage resources 1060 may include any suitable number of storage components, and the storage components may differ in type and/or configuration. The storage resources 1060 may include persistent storage resources (e.g., disk drives, block storage, databases, data repositories, etc.) and/or volatile storage resources.

The data injector 1010 may define specific data values for use in the pattern-based detection system 1000. The data values may be defined manually (e.g., with direct user intervention), automatically (e.g., without direct user intervention), or a combination thereof. The data values may be defined using any suitable techniques. For example, at least a portion of the data values may be generated based on the capture of real-world transactions in the service-oriented system 190. Accordingly, at least a portion of the data values may represent real-world data used within the service-oriented system 190. Alternatively, at least a portion of the data values may be generated synthetically. Elements of the data values may be associated with corresponding data fields. For example, an e-mail address in the data values may be associated with an e-mail address field that is used by one or more of the services 190A-190N. A data value associated with a particular data field may be defined such that it conforms to any applicable standard(s) for the data field. For example, an e-mail address defined in the data values may be a string that appears to be a well-formed e-mail address, even though the address (i.e., the username and/or domain) may be invalid in practice. The data values may be highly specific or even unique for a given data field within the service-oriented system 190. In one embodiment, a defined data value may include a string that may be pattern-matched as well as one or more metadata values that identify, for example, the location or endpoint at which the data value was injected into the service-oriented system 190.

The data values may be provided to the service-oriented system 190 in various ways. In one embodiment, the data injector 1010 may inject individual data values into various storage locations in the storage resources 1060. In one embodiment, the data injector 1010 may store elements of the data values in various databases and/or data repositories that are implemented using the storage resources 1060. For example, the data injector 1010 may insert an e-mail address into an appropriate location in a customer database and/or ordering database in the storage resources 1060. The storage locations at which the defined data values are injected may represent various levels or portions of the service-oriented system 190, including front-end systems, back-end systems, etc. In one embodiment, the data injector 1010 may be configured to interact with any suitable component of the storage resources 1060, e.g., using an application programming interface (API) for the component to cause the component to store the defined data values. In one embodiment, the data injector 1010 may automatically inject individual data values into various storage locations. In one embodiment, the data injector 1010 may inject individual data values into various storage locations based on manual intervention by a user.

In one embodiment, the data injector 1010 may generate requests to be handled by individual services 190A-190B. A service request generated by the data injector 1010 may instruct a relevant one of the services 190A-190B to perform one or more tasks. Some of the service requests may cause a recipient service to pass one or more additional service requests to one or more additional services. In various embodiments, service requests generated by the data injector 1010 may or may not include elements of the defined data values. However, the service requests that do not include elements of the data values may cause the services 190A-190B to load elements of the data values from the storage resources 1060; the services may then pass the retrieved elements of the data values to other services using additional requests or responses. In one embodiment, the data injector 1010 may automatically generate the service requests. In one embodiment, the data injector 1010 may generate service requests based on manual intervention by a user.

The pattern-based detection system 1000 may include a plurality of components configured for monitoring interactions between services and determining which of the services process or store data that matches particular patterns. For example, the service 190A may include an interaction monitoring functionality 1020A. The interaction monitoring functionality 1020A may monitor or track interactions between the service 190A and other services (or components of services) in the service-oriented system 190. The monitored interactions may include service requests 1025A (i.e., requests for services to be performed, e.g., by the service 190A), responses 1026A to requests, and other suitable events. The monitored interactions may include the service requests generated by the data injector 1010 as well as any subsequent requests generated for downstream services. Similarly, service 190B may include an interaction monitoring functionality 1020B that monitors service requests 1025B (i.e., requests for services to be performed, e.g., by the service 190B) and responses 1026B to requests, and service 190N may include an interaction monitoring functionality 1020N that monitors service requests 1025N (i.e., requests for services to be performed, e.g., by the service 190N) and responses 1026N to requests. To implement the interaction monitoring 1020A-1020N, lightweight instrumentation may be added to the services 190A-190N. The instrumentation (e.g., a reporting agent associated with each service) may collect and report data associated with each inbound request, outbound request, or other service interaction (e.g., a timer-based interaction) processed by a service.

In one embodiment, the interaction monitoring functionality 1020A-1020N may monitor service interactions such as service requests 1025A-1025N and service responses 1026A-1026N in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions. Running the pattern-based detection system 1000 in a test environment may include injecting particular data values into service requests in order to identify services that process the injected data.

Additionally, the service 190A may include a pattern matching functionality 1030A, the service 190B may include a pattern matching functionality 1030B, and the service 190N may include a pattern matching functionality 1030N. The pattern matching functionality 1030A-1030N may compare suitable portions of the service interactions (e.g., the service requests 1025A-1025N and/or responses 1026A-1026N) against a set of patterns. The portions of the service requests 1025A-1025N (or other suitable service interactions) may include, for example, parameter values and/or parameter names, as well as any other data or metadata that may include data of interest to the pattern matching functionality 1030A-1030N. The patterns may include, for example, strings and/or regular expressions. At least a portion of the patterns may be configured to match individual elements of the defined data values. For example, a pattern corresponding to a defined data value may include all or part of the characters or values in the defined data value and potentially one or more wildcard operators. If any matches are found, the service may report the matches to the data analyzer 1050.

In one embodiment, the same set of patterns may be used by more than one of the services (e.g., services 190A, 190B, and 190N). However, it is contemplated that different services may also have different sets of patterns, e.g., based on the types of data that the services tend to process and/or store. The patterns may be promulgated to the various services and kept up-to-date using any suitable techniques. As discussed above, at least some of the patterns may be configured to match particular ones of the defined data values.

The data analyzer 1050 may include a pattern aggregation functionality. Using the pattern aggregation functionality, the data analyzer 1050 may receive data relating to matched patterns from services, including matched patterns for elements of the defined data values. All the data received from the services may be stored as matched patterns. The matched patterns may indicate, for each match, the pattern that was matched. The matched patterns may also indicate, for each match, additional information such as the data that matched the pattern, data identifying the service that received the request and found the match (including the service name, the service instance, etc.), data identifying the service that sent the request (including the service name, the service instance, etc.), any additional data or metadata associated with the relevant service request, an application programming interface (API) that was invoked to send the service request, and/or any other information suitable for identifying services that process or store particular elements of data or types of data.

The data analyzer 1050 may include a data flow analysis functionality. The data flow analysis functionality may analyze the matched patterns and generate suitable reports and/or visualizations based on the matched patterns. For example, a report generated by the data flow analysis functionality may indicate the identities of the services that process data matching a particular pattern, along with other relevant information. As another example, a data flow visualization generated by the data flow analysis functionality may show the connections between services that process or store data that matches a particular pattern. In one embodiment, a defined data value may include a string that may be pattern-matched as well as one or more metadata values that identify, for example, the location or endpoint at which the data value was injected into the service-oriented system 190. Accordingly, the data flow analysis functionality may receive this data and identify the point (e.g., storage location, service, etc.) at which a defined data value was injected into the distributed system. Reports or visualizations may be generated based on queries submitted by users, where the queries may indicate, for example, a pattern or corresponding type of data to be reported on or visualized.

In this manner, the pattern-based detection system 1000 may identify services that process or store particular types of data, including particular elements of the defined data values. In one embodiment, the particular types of data may include "sensitive" data, i.e., data whose security is important. Types of sensitive data may include, for example, financial data or payment data (e.g., credit card numbers, gift card identifiers, etc.), personal identification data (e.g., Social Security numbers), e-mail address data, physical address data, etc. In one embodiment, the detected data may include one or more specific data values that are not expected to be seen at a particular service. In one embodiment, using appropriate patterns, the pattern-based detection system 1000 may identify services that process or store data that should be encrypted but that is processed or stored in an insufficiently secure (e.g., plaintext) format. In one embodiment, the pattern-based detection system 1000 may identify services that process or store types of data that the services should not be authorized to handle. In this manner, the pattern-based detection system 1000 may be used to identify potential security breaches in a distributed, service-oriented system. Additionally, the pattern-based detection system 1000 may also be used to identify services that are not functioning as expected. It is contemplated that the techniques described herein may be used to identify services in a distributed, service-oriented system that process and/or store substantially any particular type or value of data.

In one embodiment, the pattern-based detection system 1000 may identify services that do not process or store particular types of data. Using similar techniques as those described above, the pattern matching functionality 1030A-1030N may identify and report services in which a particular pattern is missing from the data and/or metadata associated with a service request. In this manner, the pattern-based detection system 1000 may be used to identify services that are not functioning as expected.

In one embodiment, all or nearly all of the service requests 1025A-1025N may be processed using the pattern matching functionality 1030A-1030N. In one embodiment, however, only a subset of the service interactions may be processed using the pattern matching functionality 1030A-1030N. Any suitable technique may be used to identify which of the service interactions to search for the patterns. In one embodiment, probabilistic sampling techniques may be used to initiate the pattern-matching operation for a certain percentage (e.g., 1%) of all service interactions. In one embodiment, the pattern-matching operation may be enabled on an interaction-by-interaction basis, such as by including one or more bits in a request identifier or trace identifier that instruct the service to enable pattern-matching for a particular interaction.

Reports and/or visualization data may be generated based on the matched patterns received from the various services. The matched patterns may include or be received along with connectivity data that is usable to generate the nodes and edges in a call graph. The connectivity data may be gathered using the interaction monitoring functionality. Accordingly, the interaction monitoring functionality for the various services in the call graph may collect data indicative of service interactions involved in satisfying a particular initial request, e.g., data indicative of a route taken in satisfying a service request and/or a hierarchy of call pathways between services. The route may correspond to a set of call pathways between services. The call pathways may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. A call graph may include a hierarchical data structure that include nodes representing the services and edges representing the interactions. In some cases, a call graph may be a deep and broad tree with multiple branches each representing a series of related service calls. The data flow analysis functionality may use any suitable data and metadata to build call graph, such as request identifiers and metadata associated with services and their interactions.

Illustrative Computer System

In at least some embodiments, a computer system that implements a portion or all of one or more of the technologies described herein may include a general-purpose computer system that includes or is configured to access one or more computer-readable media. FIG. 7 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or different types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing devices configured to implement a sensitive data detection system and a service-oriented system, wherein the service-oriented system comprises a plurality of services including a particular service, and wherein the sensitive data detection system is configured to:
      retrieve a service model specifying one or more operations exposed by the particular service, wherein the service model is retrieved based at least in part on a name of the particular service;
      extract names of the one or more operations from the service model;
      extract names of one or more parameters of the one or more operations from the service model;
      identify one or more sensitive operations among the one or more operations, wherein the names of the one or more operations and the names of the one or more parameters are checked against a dictionary of sensitive terms;
      identify one or more consumers of the particular service using a metadata repository, wherein the metadata repository specifies a dependency of the one or more consumers on one or more client-side packages of the particular service;
      identify one or more of the sensitive operations called by the consumers in source code for the one or more consumers, wherein the source code for the one or more consumers is retrieved from a source code repository; and
      responsive to identification of a particular called sensitive operation, implement one or more security measures to enhance security of data to be processed by the particular called sensitive operation, wherein the one or more security measures include at least one of:
         generation of a directed graph representing flow of sensitive data through one or more of the services, wherein the data to be processed by the particular sensitive operation comprises the sensitive data,
         modification of source code of the service, or
         migration of the service from a current deployment environment to another deployment environment that is more secure than the current deployment environment.

2. The system as recited in claim 1, wherein the sensitive data detection system is configured to:
   validate a relationship of the service model to the particular service based at least in part on source code for the particular service, wherein the source code for the particular service is retrieved from the source code repository, and wherein, in validating the relationship, the static analysis system is configured to match the names of the one or more operations in the service model to names of the one or more operations in the source code.

3. The system as recited in claim 1, wherein the sensitive data detection system is configured to:
generate a map of service interactions in the service-oriented system, wherein service interactions associated with the one or more sensitive operations are emphasized in the map.

4. The system as recited in claim 1, wherein the sensitive data detection system is configured to:
perform an action to secure sensitive data used by the one or more sensitive operations.

5. A computer-implemented method, comprising:
performing, by a data detection system implemented on one or more computing devices:
obtaining a specification of one or more operations exposed by a service in a service-oriented system;
determining names of the one or more operations in the specification;
determining names of one or more parameters of individual ones of the one or more operations in the specification;
determining one or more sensitive operations among the one or more operations, wherein the names of the one or more operations and the names of the one or more parameters are checked against a dictionary of sensitive terms;
determining one or more consumers of the one or more sensitive operations; and
responsive to determining one or more sensitive operations, implementing one or more security measures to enhance security of data to be processed by one of the one or more sensitive operations, wherein the one or more security measures include at least one of:
generating a directed graph representing flow of sensitive data through one or more of the services, wherein the data to be processed by one of the one or more sensitive operations comprises the sensitive data,
modifying source code of the service in order to increase security of the service, or
migrating the service from a current deployment environment to another deployment environment that is more secure than the current deployment environment.

6. The method as recited in claim 5, further comprising:
validating a relationship of the specification to the service based at least in part on source code for the service, wherein validating the relationship comprises matching the names of the one or more operations in the specification to names of the one or more operations in the source code.

7. The method as recited in claim 6, wherein the source code for the service is obtained from a source code repository, and wherein the source code repository stores source code for a plurality of services of the service-oriented system.

8. The method as recited in claim 5, wherein the specification is obtained from a source code repository based at least in part on a name of the service, and wherein a name of the specification comprises the name of the service.

9. The method as recited in claim 5, wherein determining the one or more consumers of the one or more sensitive operations comprises:
identifying one or more consumers of the service using a metadata repository, wherein the metadata repository specifies a dependency of the one or more consumers on one or more client-side packages of the service; and
identifying one or more of the sensitive operations called by the consumers in source code for the one or more consumers, wherein the source code for the one or more consumers is obtained from a source code repository.

10. The method as recited in claim 5, further comprising:
generating a map of service interactions in the service-oriented system, wherein service interactions associated with the one or more sensitive operations are emphasized in the map.

11. The method as recited in claim 5, further comprising:
performing an action to secure sensitive data used by the one or more sensitive operations.

12. The method as recited in claim 5, further comprising:
prioritizing a security review for the particular service based at least in part on the one or more sensitive operations.

13. The method as recited in claim 5, wherein the one or more parameters comprise one or more complex data structures, and wherein names of one or more internal parameters of the one or more complex data structures are checked against the dictionary of sensitive terms.

14. A non-transitory computer-readable storage medium storing program instructions computer-executable to perform:
obtaining a service model specifying one or more operations exposed by a service in a service-oriented system, wherein the service model is obtained from a source code repository storing service models for a plurality of services in the service-oriented system;
extracting names of the one or more operations from the service model;
extracting names of one or more parameters of the one or more operations from the service model;
identifying one or more sensitive operations among the one or more operations, wherein the names of the one or more operations and the names of the one or more parameters are checked against a dictionary of sensitive terms;
identifying one or more consumers of the one or more sensitive operations; and
implementing one or more security measures to enhance security of data to be processed by one of the one or more sensitive operations, wherein the one or more security measures include at least one of:
generating a directed graph representing flow of sensitive data through one or more of the services, wherein the data to be processed by the one of the one or more sensitive operations comprises the sensitive data,
modifying source code of the service in order to increase security of the service, or
migrating the service from a current deployment environment to another deployment environment that is more secure than the current deployment environment.

15. The computer-readable storage medium as recited in claim 14, wherein the program instructions are further computer-executable to perform:
validating a relationship of the service model to the service based at least in part on source code for the service, wherein validating the relationship comprises matching the names of the one or more operations in the service model to names of the one or more operations in the source code.

16. The computer-readable storage medium as recited in claim 15, wherein the source code for the service is obtained from the source code repository, and wherein the source code repository stores source code for individual ones of the plurality of services in the service-oriented system.

17. The computer-readable storage medium as recited in claim 14, wherein the service model is obtained from the source code repository based at least in part on a name of the service, and wherein a name of the service model comprises the name of the service.

18. The computer-readable storage medium as recited in claim 14, wherein the program instructions are further computer-executable to perform:
  identifying one or more consumers of the service using a metadata repository, wherein the metadata repository specifies a dependency of the one or more consumers on one or more client-side packages of the service; and
  identifying one or more of the sensitive operations called by the consumers in source code for the one or more consumers, wherein the source code for the one or more consumers is obtained from the source code repository.

19. The computer-readable storage medium as recited in claim 14, wherein the program instructions are further computer-executable to perform:
  generating a map of service interactions in the service-oriented system, wherein service interactions associated with the one or more sensitive operations are emphasized in the map.

20. The computer-readable storage medium as recited in claim 14, wherein the program instructions are further computer-executable to perform:
  performing an action to secure sensitive data used by the one or more sensitive operations.

* * * * *